(12) United States Patent
Wang

(10) Patent No.: US 7,253,544 B2
(45) Date of Patent: Aug. 7, 2007

(54) SPINDLE MOTOR WITH ARRANGEMENT CAPABLE OF INHIBITING HALF-OMEGA WHIRL INDUCED DURING OPERATION

(75) Inventor: Kuo-Jen Wang, Taoyuan (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 11/052,003

(22) Filed: Feb. 4, 2005

(65) Prior Publication Data

US 2006/0175921 A1 Aug. 10, 2006

(51) Int. Cl.
*H02K 7/09* (2006.01)
(52) U.S. Cl. .................................................. 310/90.5
(58) Field of Classification Search ............. 310/67 R, 310/90, 90.5, 51; 360/97.02, 98.07, 99.08
See application file for complete search history.

(56) References Cited

U.S. PATENT DOCUMENTS

| 5,036,235 | A |   | 7/1991 | Kleckner ................... 310/90.5 |
| 5,304,879 | A | * | 4/1994 | Suzuki et al. ............. 310/67 R |
| 5,874,793 | A | * | 2/1999 | Kuwayama et al. ....... 310/90.5 |
| 6,215,219 | B1 | * | 4/2001 | Hwang ...................... 310/90.5 |
| 6,307,295 | B1 | * | 10/2001 | Murabe et al. ............ 310/90.5 |
| 6,501,616 | B1 | * | 12/2002 | Neal ....................... 360/99.08 |

\* cited by examiner

*Primary Examiner*—Tran Nguyen
(74) *Attorney, Agent, or Firm*—Birch, Stewart, Kolasch & Birch, LLP

(57) ABSTRACT

A spindle motor, especially for an optical disc drive, includes a bearing system, a shaft and a magnetic apparatus. The bearing system thereon a radial orientation is defined. The shaft is rotatably inserted into the bearing system and rotates relative to the bearing system during operation of the spindle motor. The magnetic apparatus functions by applying a magnetic force on the shaft, toward the radial orientation of the bearing system, to inhibit a Half-omega whirl (HOW) of the shaft induced during rotation of the shaft relative to the bearing system.

4 Claims, 9 Drawing Sheets

SPINDLE MOTOR WITH ARRANGEMENT CAPABLE OF INHIBITING HALF-OMEGA WHIRL INDUCED DURING OPERATION

BACKGROUND OF THE INVENTION

1. Field of the Invention

The invention relates to a spindle motor, especially for an optical disc drive, capable of inhibiting the Half-omega whirl induced during operation.

2. Description of the Prior Art

One source of vibration in a disc drive is from the spindle motors that they employ. These spindle motors typically include a stator comprising a core having windings arranged thereabout and a rotor shaft. Bearings support the rotor shaft in the radial and axial directions, the bearings being lubricated by impregnated or externally supplied fluid lubricant. One particularly common vibration mode occurs at approximately half the shaft rotation frequency due to the bearings dynamic instability. This vibration mode is called Half-Omega whirl (HOW). This Half-Omega whirl phenomenon is especially prominent in motors that use fluid dynamic bearings while spinning at very low speed.

The traditional solution to this problem includes the following: (A) controlling the gap between the bearing and the shaft to reduce HOW; (B) using other bearing system such as fluid-dynamic bearing system; (C) using some feedback and active control system; and (D) using some preload force to remove the instability by some other external applied dominant preload force.

However, for solution (A), the smaller gap causes some side effect such as higher friction. The bearing system in solution (B) costs higher and the solution (C) isn't applicable for all types of bearing system.

U.S. Pat. No. 5,036,235 discloses a brushless DC motor having stable hydrodynamic bearing system, which has rotational axis of rotor eccentric and parallel to centre line of stator core. This prior art uses a preload force to remove the instability without requiring additional parts and/or labor. But the eccentric stator core would cause a torque variation during rotation by imbalanced magnetic air gap.

Accordingly, an objective of the invention is to provide a spindle motor capable of inhibiting the Half-omega whirl induced during operation.

SUMMARY OF THE INVENTION

To achieve the foregoing objective and to overcome the shortcomings discussed above, the invention provides a spindle motor, especially for an optical disc drive, capable of inhibiting the Half-omega whirl induced during operation. The invention applies magnetic dominant force to preload the bearing such that the shaft will not whirl around. The spindle motor includes a bearing system, a shaft and a magnetic apparatus. The bearing system thereon a radial orientation is defined. The shaft is rotatably inserted into the bearing system and rotates relative to the bearing system during operation of the spindle motor. The magnetic apparatus functions by applying a magnetic force on the shaft, toward the radial orientation of the bearing system, to inhibit a Half-omega whirl (HOW) of the shaft induced during rotation of the shaft relative to the bearing system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A spindle motor of the invention includes a bearing system, a shaft and a magnetic apparatus. The bearing system thereon is defined a radial orientation. The shaft is rotatably inserted into the bearing system and rotates relative to the bearing system during operation of the spindle motor. The magnetic apparatus functions by applying a magnetic force on the shaft, toward the radial orientation of the bearing system, to inhibit a Half-omega whirl (HOW) of the shaft induced during rotation of the shaft relative to the bearing system.

Figure 1:
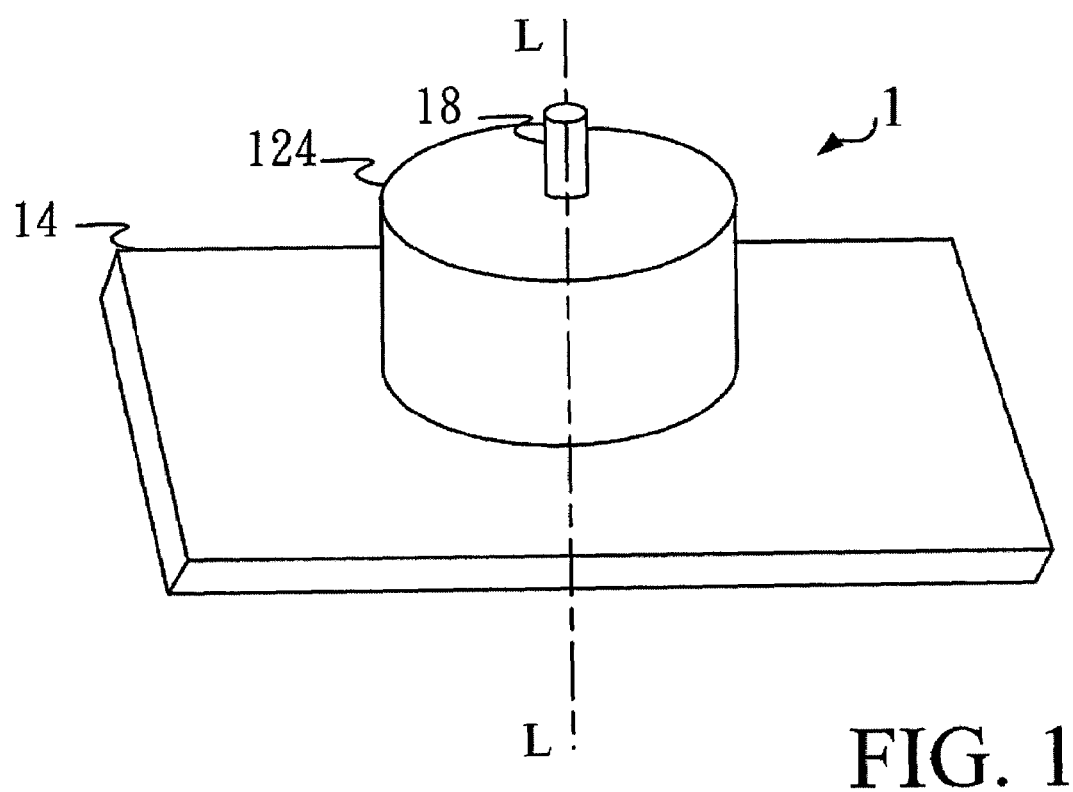
FIG. 1 is an outside perspective view of the spindle motor 1.

Referring to FIG. 1, FIG. 1 is an outside perspective view of the spindle motor 1. As shown in FIG. 1, the spindle motor 1 includes a shaft 18, a casing 124 and a base 14. The shaft 18 and the casing 124 are rotatable relative to the base 14.

Figure 2:
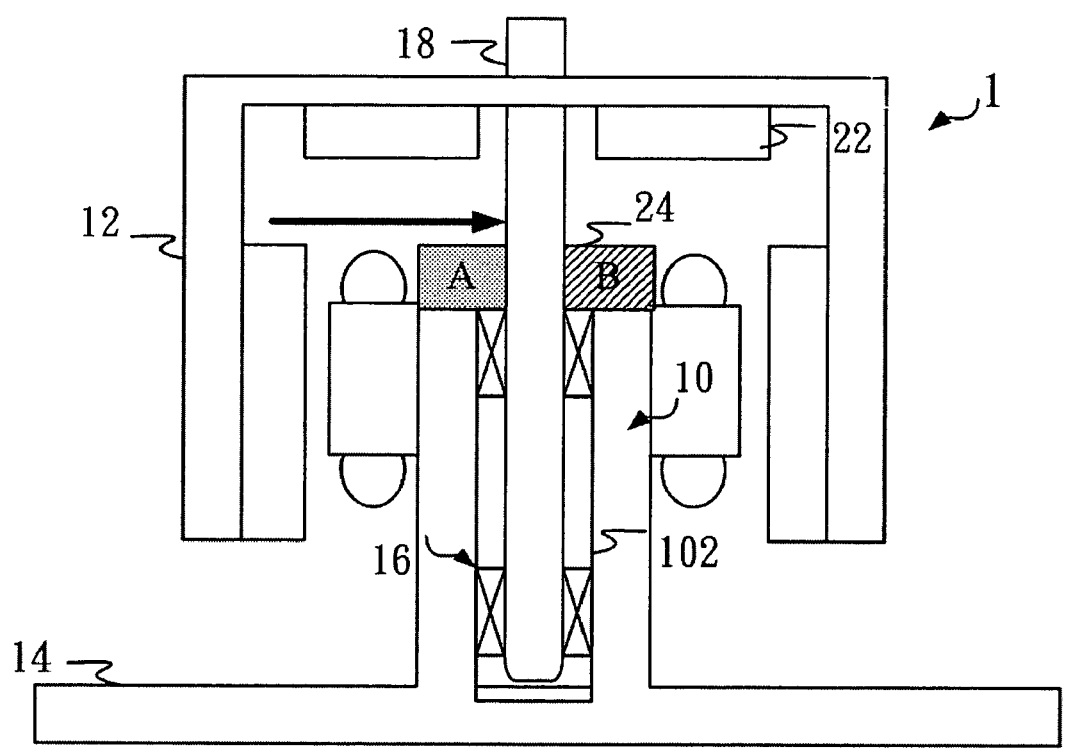
FIG. 2 is a cross-sectional view in FIG. 1 along the L-L line showing the spindle motor 1 according to the first preferred embodiment of the invention.

FIG. 2 is a cross-sectional view in FIG. 1 along the L-L line showing the spindle motor 1 according to the first preferred embodiment of the invention.

As shown in FIG. 2, according to the first preferred embodiment of the invention, the spindle motor 1 further includes a stator 10 and a rotor 12. The stator 10 includes a sleeve 102 adapted to receive the bearing system, and the sleeve has an opening. The rotor 12, mounted on the shaft 18, is capable of being driven to rotate together with the shaft 18 relative to the bearing system 16 and the stator 10 during the operation of the spindle motor 1. The rotor 12 has a bottom surface facing the opening of the sleeve 102. The magnetic apparatus includes a magnet member 22 and a magnetic permeable member 24. The magnet member 22, mounted on the bottom surface of the rotor 12, functions by providing a uniform magnetic field. The magnetic permeable member 24, mounted on the opening of the sleeve 102 and disposed so as to be affected by the magnetic field, is configured to induce, by the magnetic field, the magnetic force on the shaft 18 toward the radial orientation of the bearing system 16.

Figure 3:
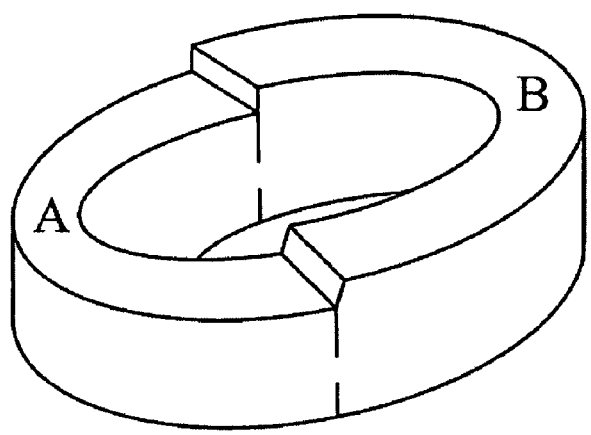
FIG. 3 shows the possibility composition of the highly magnetic permeable member 24 of the first preferred embodiment of the invention.
Figure 3:
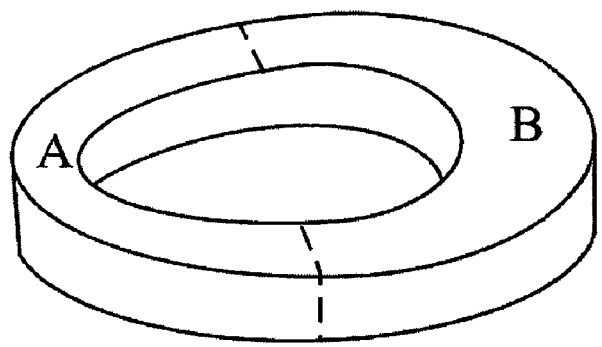
Figure 3:
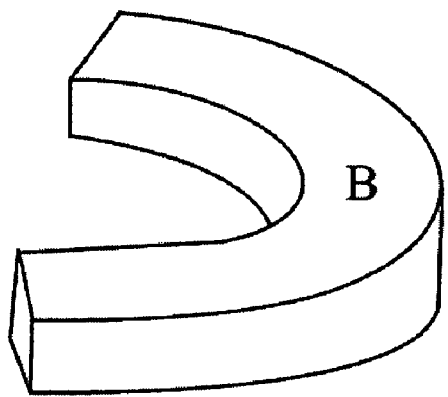

FIG. 3 shows the possibility composition of the magnetic permeable member 24 of the first preferred embodiment of the invention. In the first preferred embodiment, the magnetic permeable member 24 includes a first part with a first air gap affected by the magnetic field and a second part with a second air gap affected by the magnetic field, and the first air gap is unequal to the second air gap. In the first preferred embodiment, the magnetic permeable member 24 includes a first part with a first area affected by the magnetic field and a second part with a second area affected by the magnetic field, and the first area is unequal to the second area. In another scheme, the magnetic permeable member 24 is a C-shaped member.

Figure 4:
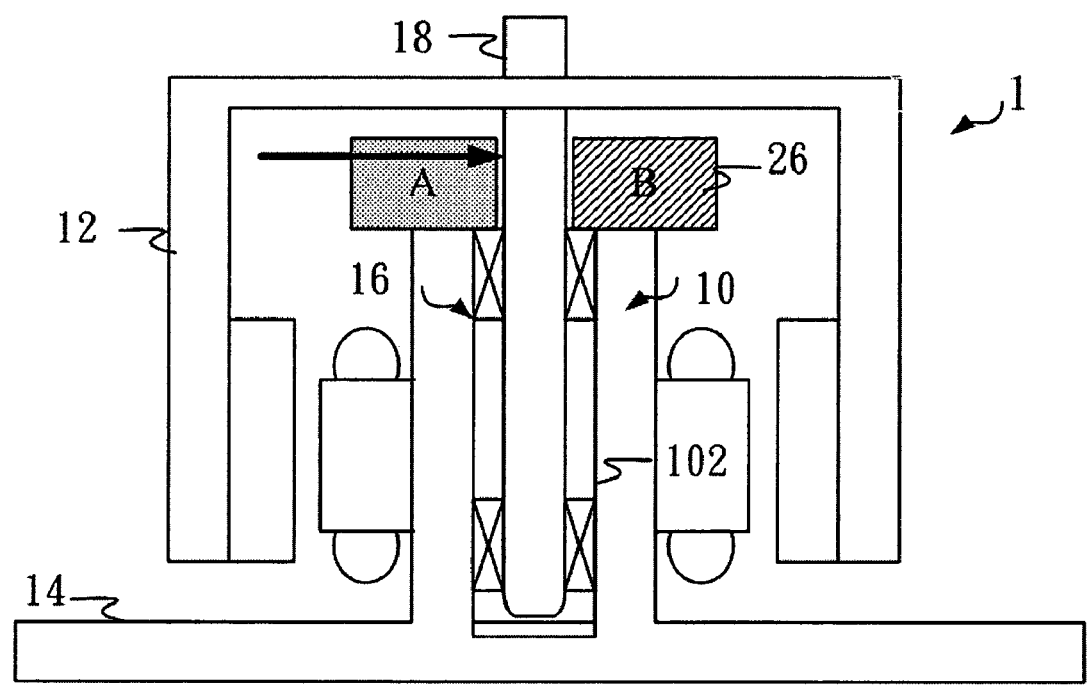
FIG. 4 is a cross-sectional view in FIG. 1 along the L-L line showing the spindle motor 1 according to the second preferred embodiment of the invention.

FIG. 4 is a cross-sectional view in FIG. 1 along the L-L line showing the spindle motor 1 according to the second preferred embodiment of the invention. In FIG. 4, the element having the same numeral notations at that in FIG. 2 performs the same function as recited with regard to FIG. 2. The rotor 12 has a highly magnetic permeable part facing the opening of the sleeve 102 and normally the rotor itself serves the purpose.

As shown in FIG. 4, according to the second preferred embodiment of the invention, the magnetic apparatus of the spindle motor 1 includes a magnet member 26. The magnet member 26, mounted on the opening of the sleeve 102 and disposed so as to affect the magnetic permeable part of the rotor 12, is configured to provide a non-uniform magnetic field which affects the magnetic permeable part to induce the magnetic force on the shaft 18 toward the radial orientation of the bearing system 16.

Figure 5:
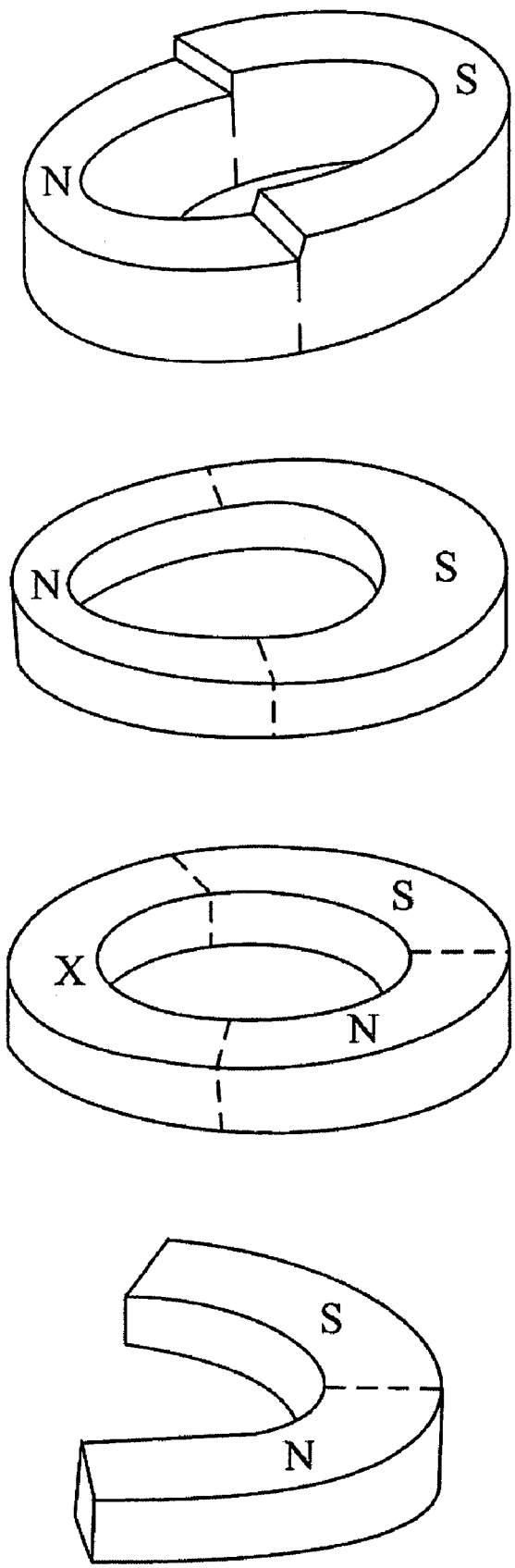
FIG. 5 shows the possibility composition of the magnet member 26 of the second preferred embodiment of the invention.

FIG. 5 shows the possibility composition of the magnet member 26 of the second preferred embodiment of the invention. In the second preferred embodiment, the magnet member 26 includes a first part with a first magnetic strength and a second part with a second magnetic strength unequal to the first magnetic strength. In another scheme, the magnet member 26 includes a first part with a first area affecting the magnetic permeable part and a second part with a second area affecting the magnetic permeable part, and the first area is unequal to the second area. In another scheme, the magnet member 26 is a C-shaped member. In another scheme, the magnet member 26 includes a first part with a first thickness and a second part with a second thickness unequal to the first thickness.

Figure 6:
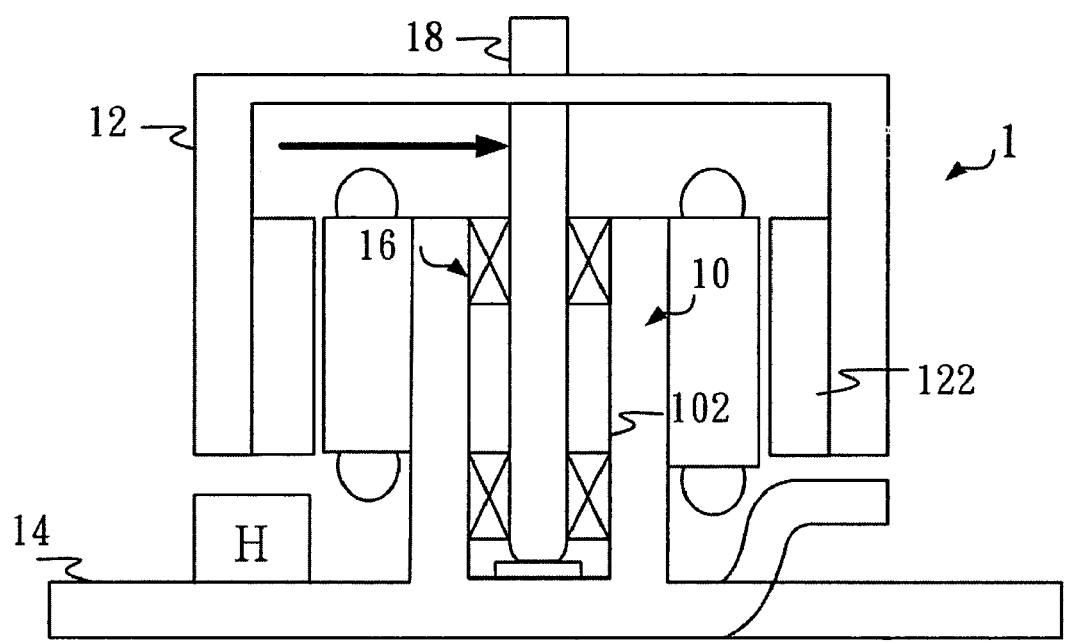
FIG. 6 is a cross-sectional view in FIG. 1 along the L-L line showing the spindle motor 1 according to the third preferred embodiment of the invention.

Referring to FIG. 6, FIG. 6 is a cross-sectional view in FIG. 1 along the L-L line showing the spindle motor 1 according to the third preferred embodiment of the invention. In FIG. 6, the element having the same numeral notations at that in FIG. 2 performs the same function as recited with regard to FIG. 2. The sleeve 102 has a partially levitated peripheral with magnetic permeable material. The rotor 12 has an inner wall surrounding the peripheral of the sleeve 102. The rotor 12 further includes a drive magnet 122, mounted on the inner wall, which provides a magnetic field.

As shown in FIG. 6, according to the third preferred embodiment of the invention, the magnetic apparatus of the spindle motor 1 includes a magnetic permeable base 14 which the stator 10 is mounted on so that the rotor 12 is disposed over the base 14, the base 14 having a partially levitated bent toward the drive magnet 122 such that the bent part of the base 14 is affected by the magnetic field to induce the magnetic force on the shaft 18 toward the radial orientation of the bearing system 16.

The drive magnet 122 of the third preferred embodiment includes a permanent magnet, which is mounted around a lower circumference of the inner wall of the rotor 12.

Figure 7:
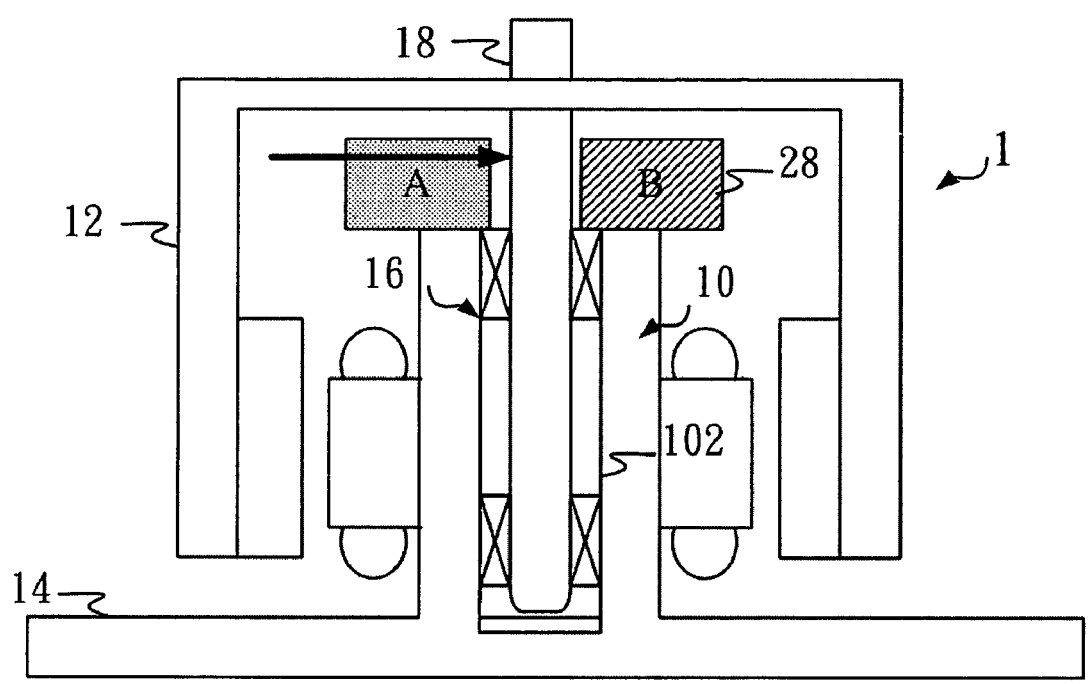
FIG. 7 is a cross-sectional view in FIG. 1 along the L-L line showing the spindle motor 1 according to the fourth preferred embodiment of the invention.

FIG. 7 is a cross-sectional view in FIG. 1 along the L-L line showing the spindle motor 1 according to the fourth preferred embodiment of the invention. In FIG. 7, the element having the same numeral notations at that in FIG. 2 performs the same function as recited with regard to FIG. 2.

As shown in FIG. 7, according to the fourth preferred embodiment of the invention, the magnetic apparatus of the spindle motor 1 includes a magnet member 28, mounted on the opening of the sleeve 102, being configured to affect the magnetic permeable shaft 18 to induce the magnetic force on the shaft 18 toward the radial orientation of the bearing system 16.

The magnet member 28 of the fourth preferred embodiment is an annular member, which is eccentric from a center of the bearing system. In an embodiment, the magnet member 28 is a C-shaped member, which is either concentric or eccentric from a center of the bearing system.

Figure 8:
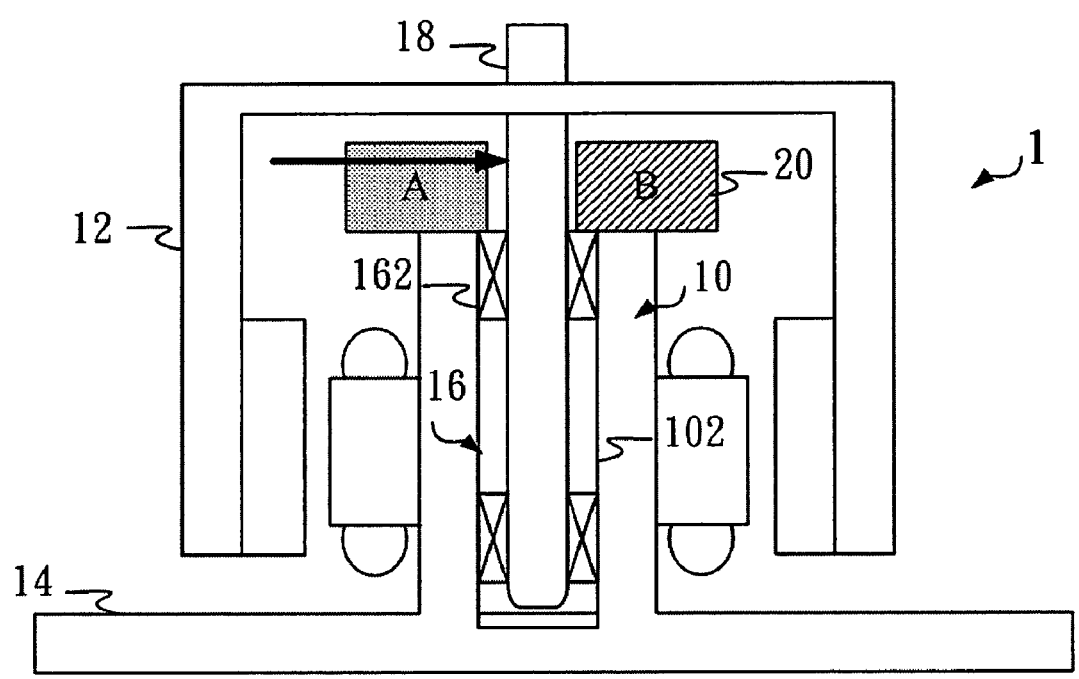
FIG. 8 is a cross-sectional view in FIG. 1 along the L-L line showing the spindle motor 1 according to the fifth preferred embodiment of the invention.

FIG. 8 is a cross-sectional view in FIG. 1 along the L-L line showing the spindle motor 1 according to the fifth preferred embodiment of the invention. In FIG. 8, the element having the same numeral notations at that in FIG. 2 performs the same function as recited with regard to FIG. 2.

As shown in FIG. 8, according to the fifth preferred embodiment of the invention, the bearing system 16 comprises a magnetic permeable upper bearing 162 disposed at the opening of the sleeve 102, the shaft 18 is also magnetic permeable. The magnetic apparatus of the spindle motor 1 includes a magnet member 20, mounted on the opening of the sleeve 102 near the upper bearing 162, being configured to be affected with the upper bearing 162 by the shaft 18 to induce the magnetic force on the shaft 18 toward the radial orientation of the bearing system 16.

The magnet member 20 of the fifth preferred embodiment is an annular magnet, which is eccentric from a center of the upper bear. In an embodiment, the magnet member 20 is a C-shaped member, which is either concentric or eccentric from a center of the bearing system.

Figure 9:
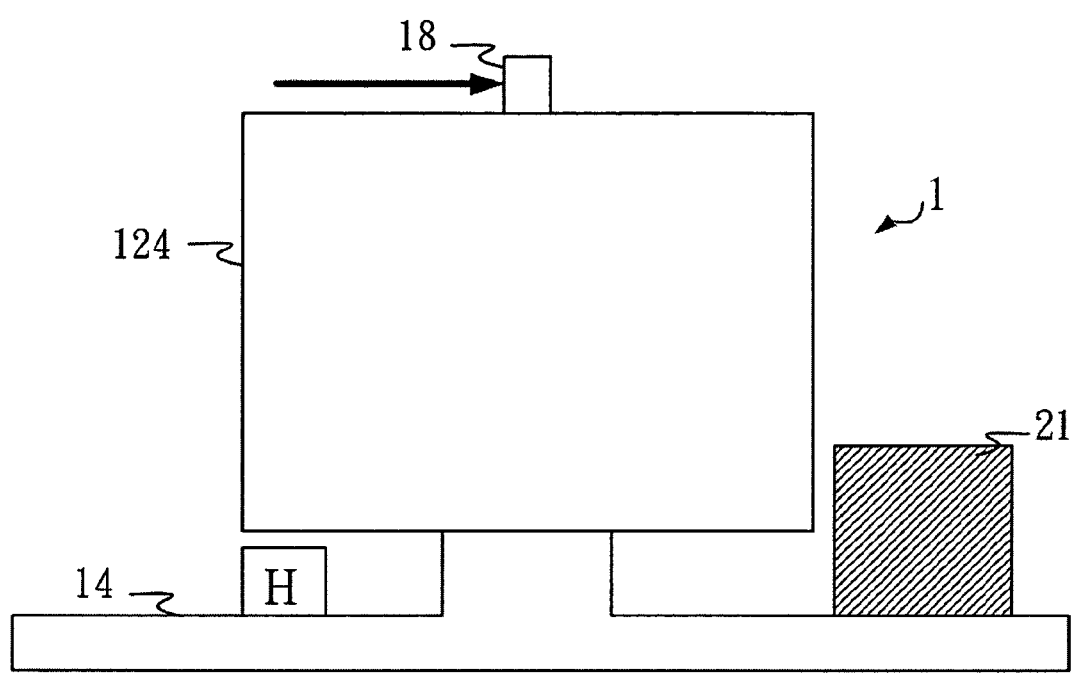
FIG. 9 shows the spindle motor 1 according to the sixth preferred embodiment of the invention.

FIG. 9 shows the spindle motor 1 according to the sixth preferred embodiment of the invention. In FIG. 9, the element having the same numeral notations at that in FIG. 2 performs the same function as recited with regard to FIG. 2. The rotor 12 has a magnetic permeable casing 124 covering the stator 10.

As shown in FIG. 9, according to the sixth preferred embodiment of the invention, the magnetic apparatus of the spindle motor 1 includes a magnet member 21, disposed outside the casing 124 of the rotor 12, for providing a magnetic field to affect the casing 124 of the rotor 12 to induce the magnetic force on the shaft 18 toward the radial orientation of the bearing system 16.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A spindle motor, comprising:
a bearing system defining a radial orientation;
a shaft rotatably inserted into the bearing system, the shaft rotating relative to the bearing system during operation of the spindle motor;
a stator comprising a sleeve adapted to receive the bearing system, the sleeve having an opening; and
a rotor, mounted on the shaft, capable of being driven to rotate together with the shaft relative to the bearing system and the stator during the operation of the spindle motor, the rotor having a bottom surface facing the opening of the sleeve;
a magnetic apparatus comprising a magnet member mounted on the bottom surface of the rotor and a magnetic permeable member mounted on the opening of the sleeve, the magnet member being used for providing a uniform magnetic field, the magnetic permeable member being affected by the magnetic field, being configured to induce, by the magnetic field, a magnetic force on the shaft toward the radial orientation of the bearing system, so as to inhibit a Half-omega whirl (HOW) of the shaft induced during rotation of the shaft relative to the bearing system.

2. The spindle motor of claim 1, wherein the magnetic permeable member is a C-shaped member.

3. The spindle motor of claim 1, wherein the magnetic permeable member comprises a first part with a first area affected by the magnetic field and a second part with a second area affected by the magnetic field, and the first area is unequal to the second area.

4. The spindle motor of claim 1, wherein the magnetic permeable member comprises a first part with a first air gap affected by the magnetic field and a second part with a second air gap affected by the magnetic field, and the first air gap is unequal to the second air gap.

* * * * *